D. D. HAHNE.
LEVELING ATTACHMENT FOR CAMERAS.
APPLICATION FILED JUNE 21, 1919.
1,341,553.　　　　　　　　　　　　Patented May 25, 1920.
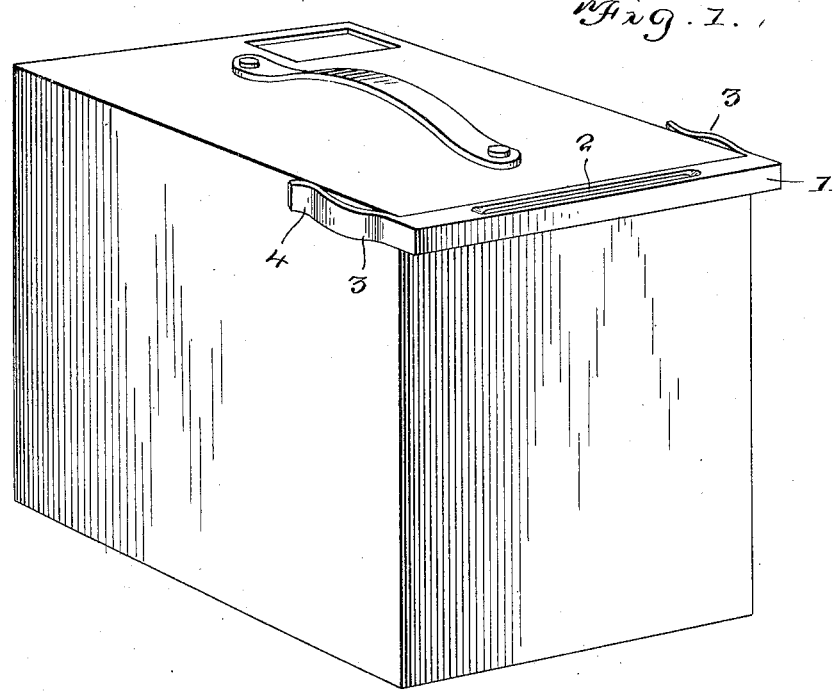
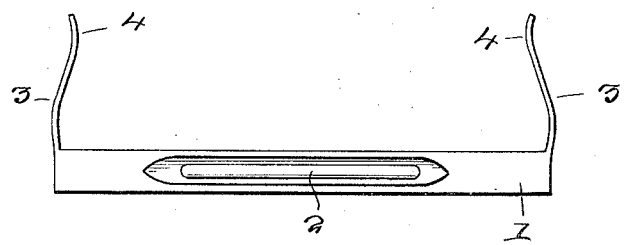
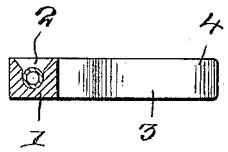
WITNESS:
D. D. Hahne
INVENTOR.
BY
Victor J. Evans
ATTORNEY.

UNITED STATES PATENT OFFICE.

DALE D. HAHNE, OF HASTINGS, NEBRASKA.

LEVELING ATTACHMENT FOR CAMERAS.

1,341,553.     Specification of Letters Patent.     Patented May 25, 1920.

Application filed June 21, 1919. Serial No. 305,725.

*To all whom it may concern:*

Be it known that I, DALE D. HAHNE, a citizen of the United States, residing at Hastings, in the county of Adams and State of Nebraska, have invented new and useful Improvements in Leveling Attachments for Cameras, of which the following is a specification.

The object of my present invention is to provide in the form of an article of manufacture an attachment through the medium of which photographic cameras, particularly the box-like amateur cameras, may be readily and accurately leveled; the attachment being readily applicable to the camera case without the assistance of extraneous means, and being susceptible of expeditious and easy removal therefrom.

To the attainment of the foregoing the invention consists in the leveling attachment hereinafter described and definitely claimed.

In the accompanying drawings, hereby made a part hereof:

Figure 1 is a perspective showing a box-like camera with my novel attachment properly positioned thereon and held of itself thereto.

Fig. 2 is an enlarged detail view of the attachment *per se*, showing the spirit vial in the body bar thereof and the resilient affixing or clamping arms at the end of said bar.

Fig. 3 is a detail view of a portion of the attachment.

Similar numerals of reference designate corresponding parts in all of the views of the drawings.

The box-like camera 1 is not of my invention, and may therefore be of the ordinary construction illustrated, or of any other construction to which my attachment is applicable.

Among other elements my novel attachment comprises a body bar 1, in which is carried a spirit vial 2. The said vial 2 is preferably displayed at the upper side of the bar 1, and the inner side of the bar— *i. e.*, the side that is opposed to the camera case, is arranged at right angles to the upper side and is flat and straight throughout. See in this connection Fig. 3. When deemed expedient, the bar 1 of the attachment may be nickel-plated or otherwise embellished with a view to enhancing the finished appearance of the camera to which the attachment is applied, and this is also true of the clamping arms 3. The said clamping arms 3 are preferably formed integral with the ends of the bar 1 and are made to reach laterally and inwardly from said ends. It is essential that the arms 3 be possessed of sufficient resiliency and strength to securely hold the bar 1 on the camera case, and it is also essential that the said arms 3 be provided adjacent to their free ends with inwardly deflected portions 4. These portions 4 are designed to be opposed to the opposite sides of the camera case, as shown in Fig. 1, so as to retain the attachment in working position on the camera without liability of casual movement or displacement of the attachment, but yet in such manner that when subjected to stress the attachment may be readily removed.

It will be apparent from the foregoing that my novel attachment is extremely simple and inexpensive, is susceptible of being quickly and easily applied to a camera without the assistance of skilled labor or tools or extraneous devices of any kind, and is calculated to enable the photographer to conveniently and accurately level the camera as is always desirable.

Having described my invention, what I claim and desire to secure by Letters-Patent, is:

1. As a new and useful article of manufacture, a leveling attachment for cameras, comprising a body bar having a flat and straight inner side adapted to be arranged against one side of a box-like camera case, a spirit vial arranged longitudinally in said bar in position to be displayed at the upper side thereof, and resilient clamping arms reaching inwardly and laterally from the ends of the flat inner side of the bar and having inwardly deflected portions adjacent to their free ends and adapted to engage opposite sides of the camera case.

2. As a new and useful article of manufacture, a leveling attachment for cameras comprising a body bar of a length to reach from one side of a box-like camera case to the opposite side thereof, and equipped with a longitudinally arranged spirit vial and having a flat and straight inner side and clamping arms reaching at right angles from the ends of said side and adapted to be opposed to and engage the opposite sides of a box-like camera case.

In testimony whereof I affix my signature.

DALE D. HAHNE.